United States Patent
Hodge

(10) Patent No.: US 10,633,143 B2
(45) Date of Patent: Apr. 28, 2020

(54) LID FOR A REUSABLE PLASTIC CONTAINER

(71) Applicant: Walmart Apollo, LLC, Bentonville, AR (US)

(72) Inventor: Shawn Morris Hodge, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 93 days.

(21) Appl. No.: 15/707,082

(22) Filed: Sep. 18, 2017

(65) Prior Publication Data
US 2018/0079553 A1 Mar. 22, 2018

Related U.S. Application Data

(60) Provisional application No. 62/396,698, filed on Sep. 19, 2016.

(51) Int. Cl.
*B65D 21/06* (2006.01)
*B65D 43/02* (2006.01)
*B65D 21/02* (2006.01)

(52) U.S. Cl.
CPC ....... *B65D 21/064* (2013.01); *B65D 43/0214* (2013.01); *B65D 21/0209* (2013.01); (Continued)

(58) Field of Classification Search
CPC .............. B65D 21/064; B65D 43/0214; B65D 21/0209; B65D 5/22; B65D 5/64; B65D 5/68; B65D 5/6652; B65D 5/6658
(Continued)

(56) References Cited

U.S. PATENT DOCUMENTS 2,116,431 A 5/1938 Gullo et al.
2,365,182 A * 12/1944 Ferguson ............... B65D 85/32
229/120
(Continued)

FOREIGN PATENT DOCUMENTS

EP 453240 B1 11/1995
EP 2769925 A1 8/2014
(Continued)

OTHER PUBLICATIONS

International Search Report and Written Opinion for Application No. PCT/US2017/051992, dated Dec. 7, 2017, 12 pages.

*Primary Examiner* — Christopher R Demeree
(74) *Attorney, Agent, or Firm* — McCarter & English, LLP; David R. Burns

(57) ABSTRACT

Exemplary embodiments provide a sheet to form a lid to substantially close a container. The sheet comprises a rectangular base having opposing side edges, opposing end edges, an upper surface and a lower surface. At least one notch is included on each of the side edges, where the notches correspond to a protrusion on an upper surface of two side walls of the container. A portion of the lower surface of the sheet at the side edges are configured to engage with the upper surface of the two side walls of the container. A foldable flap extends outwardly from each of the two end edges. The foldable flaps are configured to fold downwardly and engage against end walls of the container. The rectangular base has a thickness of at least 0.125 inches to support weight of items placed on the upper surface of the rectangular base without collapsing.

21 Claims, 13 Drawing Sheets

(52) U.S. Cl.
CPC .............. *B65D 2543/00194* (2013.01); *B65D 2543/00268* (2013.01); *B65D 2543/00527* (2013.01); *B65D 2543/00546* (2013.01); *Y02W 30/807* (2015.05)

(58) Field of Classification Search
USPC .......... 229/178, 125.29, 149, 142, 143, 147, 229/151, 152, 153, 154, 122.32
See application file for complete search history.

(56) References Cited

U.S. PATENT DOCUMENTS

| | | | | |
|---|---|---|---|---|
| 2,561,979 | A * | 7/1951 | George | B65D 5/68 |
| | | | | 220/315 |
| 3,486,680 | A * | 12/1969 | Negus, Jr. | B65D 5/4295 |
| | | | | 229/120.1 |
| 3,856,178 | A | 12/1974 | Norgaard | |
| 4,101,052 | A * | 7/1978 | Dove | B65D 5/0005 |
| | | | | 206/807 |
| 4,923,113 | A | 5/1990 | Guijarro | |
| 4,927,074 | A | 5/1990 | LaRue et al. | |
| 5,597,111 | A | 1/1997 | Mackinnon et al. | |
| 7,229,002 | B1 * | 6/2007 | Burch, Jr. | B65D 5/64 |
| | | | | 229/120 |
| 9,095,848 | B2 | 8/2015 | Carrel et al. | |
| 2004/0045486 | A1 | 3/2004 | Pistner et al. | |

FOREIGN PATENT DOCUMENTS

| | | |
|---|---|---|
| EP | 3059178 A1 | 8/2016 |
| GB | 2523595 A | 9/2015 |
| JP | H09150847 A | 6/1997 |
| JP | 2006341853 A | 12/2006 |

\* cited by examiner

LID FOR A REUSABLE PLASTIC CONTAINER

CROSS REFERENCE TO RELATED APPLICATIONS

This application claims priority to U.S. Provisional Application No. 62/396,698 filed on Sep. 19, 2016, the content of which is hereby incorporated by reference in its entirety.

BACKGROUND

Reusable plastic containers are used for transporting and/or packaging various items, and often in daily operations of entities or organizations. Reusable plastic containers often can be stacked. In some cases, smaller containers or items may be stacked on the items in the reusable plastic container for easy and efficient transport. Stacking of small containers or items on top of items may cause damage to the items, and also is not stable for the small container or box.

SUMMARY

In one embodiment, a singular sheet configured to form a lid substantially closing a container is provided. The sheet includes a rectangular base with two opposing side edges, two opposing end edges, an upper surface and a lower surface. The sheet also includes at least one notch on each of the two side edges. The notches correspond to a protrusion on an upper surface of each of two side walls of the container, and a portion of the lower surface of the sheet at the two side edges is configured to engage with the upper surface of each of the two side walls of the container. The sheet also includes a foldable flap extending outwardly from each of the two end edges, where the foldable flaps are configured to fold downwardly and engage against each of two end walls of the container. The rectangular base can have a thickness of at least 0.125 inches to support weight of items placed on the upper surface of the rectangular base without collapsing.

In another embodiment, a singular sheet configured to form a lid substantially closing a meat or egg container is provided. The sheet includes a rectangular base with two opposing side edges, two opposing end edges, an upper surface and a lower surface. The sheet also includes a foldable flap extending outwardly from each of the two end edges, where the foldable flaps are configured to fold downwardly and engage against each of two end walls of the container. The rectangular base can have a thickness of at least 0.125 inches to support weight of items placed on the upper surface of the rectangular base without collapsing.

In another embodiment, a method for forming a singular sheet for substantially closing a produce container is provided. The method includes forming a rectangular base having a thickness of at least 0.125 inches to support weight of items placed on the rectangular base. The rectangular base also has two opposing side edges, two opposing end edges, an upper surface and a lower surface. The method also includes forming at least one notch on each of the two side edges. The notches correspond to a protrusion on an upper surface of each of two side walls of the container, and a portion of the lower surface of the sheet at the two side edges is configured to engage with the upper surface of each of the two side walls of the container. The method also includes extending a foldable flap outwardly from each of the two end edges, where the foldable flaps are configured to fold downwardly and engage against each of two end walls of the container.

In yet another embodiment, a system includes a container having an open end, two opposing side walls, and two opposing end walls, where each of the two side walls have a protrusion on an upper surface of the two side walls. The system further includes a sheet having a rectangular base with two opposing side edges, two opposing end edges, an upper surface and a lower surface. At least one notch is included on the sheet on each of the two side edges, where the notches correspond to the protrusion on the upper surface of each of the two side walls of the container. A portion of the lower surface of the sheet at the two side edges is configured to engage with the upper surface of each of the two side walls of the container. A foldable flap extends outwardly from each of the two end edges of the sheet, where the foldable flaps are configured to fold downwardly and engage against each of the two end walls of the container. The sheet has a thickness of at least 0.125 inches to support weight of items placed on the upper surface of the rectangular base without collapsing.

BRIEF DESCRIPTION OF THE DRAWINGS

The accompanying figures, which are incorporated in and constitute a part of this specification, illustrate one or more embodiments of the present disclosure and, together with the description, help to explain the present disclosure. The embodiments are illustrated by way of example and should not be construed to limit the present disclosure. In the figures.

DETAILED DESCRIPTION

Conventionally, reusable plastic containers or crates (RPC) are used to transport items, and users stack additional items on top of the items in the RPC. If the items in the RPC are fragile or vulnerable, then placing anything on top of these items can damage them. For example, if the RPC is used to package and transport produce, like tomatoes, then placing items on the tomatoes causes them to bruise and makes them unsuitable for sale or consumption.

Apparatuses and systems are provided for a lid for covering an open end of a reusable plastic container or crate (RPC). Exemplary embodiments, provide a lid with a rectangular base and flaps extending from the end edges of the base. The side edges of the base includes notches that correspond to protrusions on the side walls of an RPC. A portion of the side edges of the lid rest upon the upper surface of the side walls of the RPC. The flaps are folded downwardly to engage with the interior surface of the end walls of the RPC. The lid is made of a corrugated material, and is sturdy enough to hold items on top of it. The exemplary lid described herein may be used to cover an RPC containing items to allow for placement of additional items on top of the lid and to protect the items in the RPC from damage. Additionally, the lid may also prevent dust or debris from falling into the open end of the RPC. The RPC may be referred to herein as a "container".

Traditionally, users collapsed an empty RPC to use as a lid to cover the open end of the RPC holding items. However, empty RPCs are in short supply, since RPCs are used to transport large amounts of items in warehouses and distribution centers. The collapsed RPC also presents an uneven surface making stacking of other objects difficult. Moreover, the empty RPCs have to be sanitized prior to use as a lid. This renders the use of an empty RPC as a lid costly and wasteful.

The exemplary lid described herein is a corrugated lid that is capable of sliding inside the RPC to provide support for additional smaller items or cases to be placed on top of the RPC. The exemplary lid is easy to use and place on the RPC. Additionally, a side portion of the lid rests on the wall of the RPC to provide stability, and the end flaps fold into the RPC to provide secure engagement of the lid with the RPC.

Figure 1A:
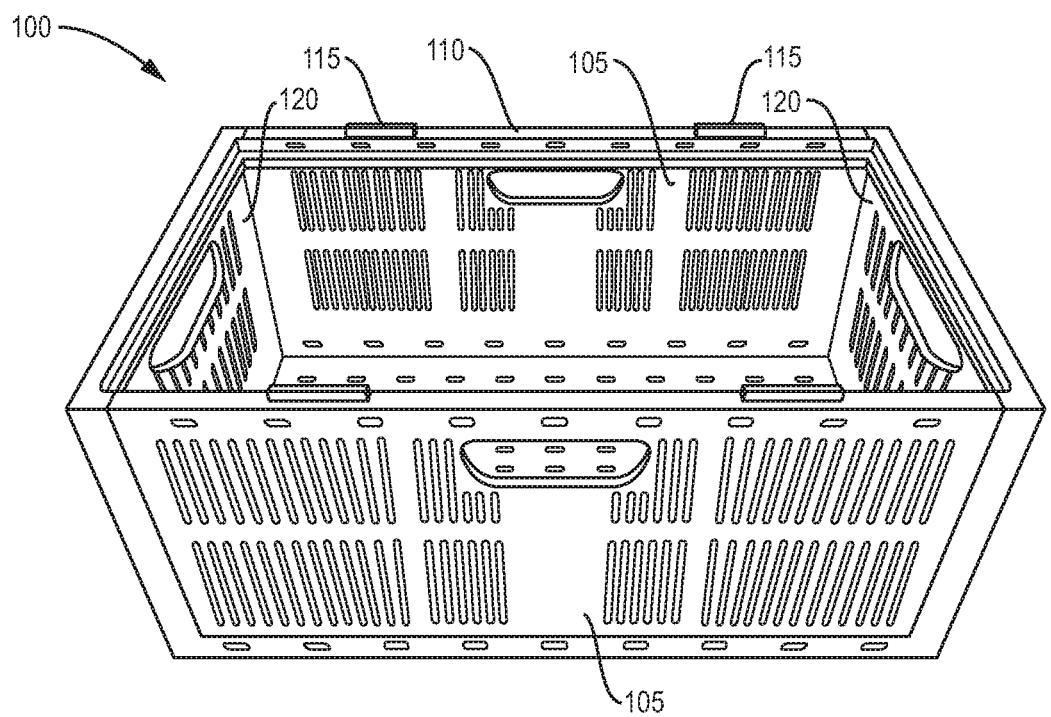
FIGS. 1A and 1B are images of an exemplary reusable plastic container (RPC)
Figure 1B:
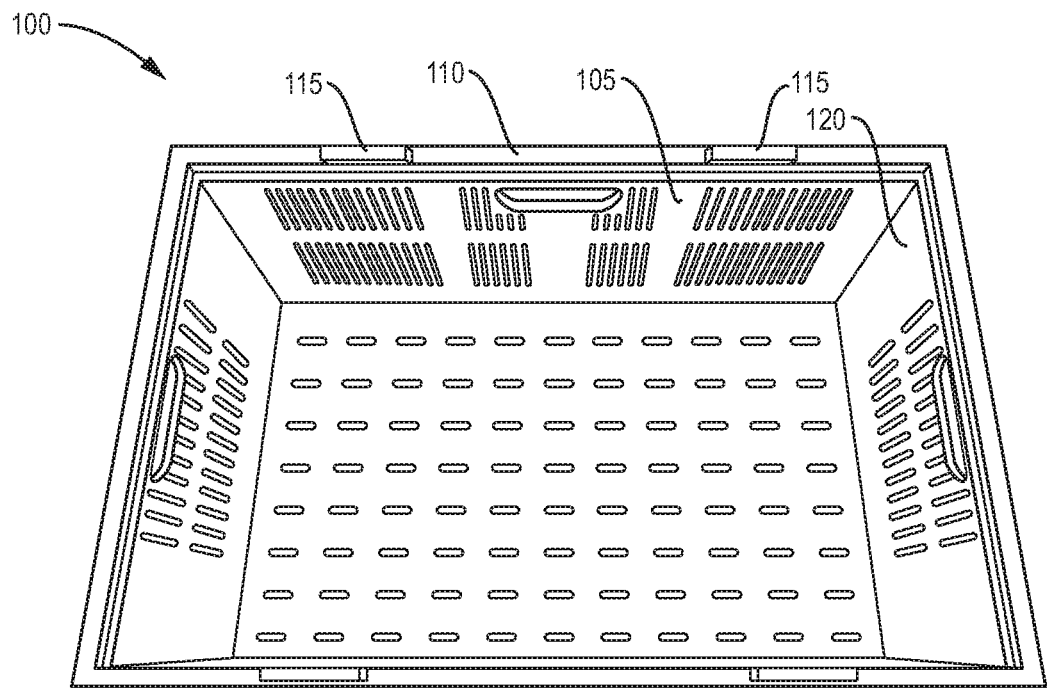

FIGS. 1A and 1B are images of an exemplary reusable plastic container (RPC) 100. FIG. 1A is a side view of the RPC 100. FIG. 1B is a top view of the RPC 100. The RPC 100 may be used for packing and transporting produce. As shown in FIGS. 1A and 1B, the RPC 100 has four walls, for example side walls 105 and end walls 120. Each of the side walls 105 have an upper surface (or rim) 110 and two protrusions 115 extending upwardly from the upper surface 110 of the RPC 100.

Figure 2:
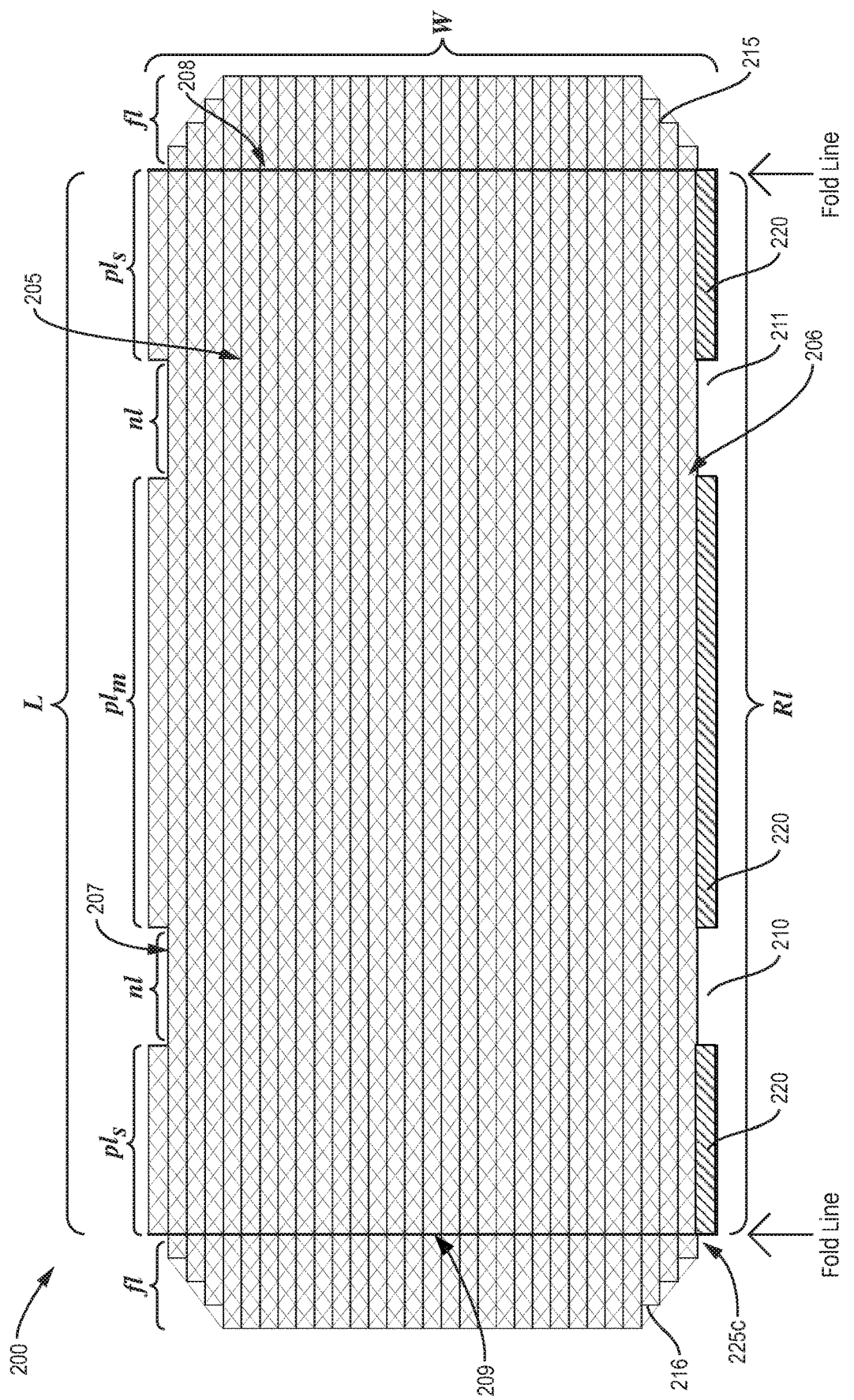
FIG. 2 is a schematic of an exemplary lid for the RPC illustrated in FIGS. 1A and 1B.

FIG. 2 is a schematic of an exemplary lid 200 for the RPC 100 illustrated in FIGS. 1A and 1B, according to an example embodiment. The lid 200 may be made of a material that provides a strong and/or durable support surface. The lid 200 may be made of a corrugated material, such as corrugated cardboard, corrugated paperboard, corrugated plastic, or another suitable corrugated material. In an example embodiment, the corrugated materials is a C flute size. In other embodiments, the corrugated material may have a flute size of A flute, B flute, E flute, F flute, or another flute size suitable for the lid described herein. In another embodiment, the lid 200 may be made of a honeycomb corrugate material. In an example embodiment, where the lid 200 is made of corrugated cardboard, the lid 200 may be waxed to make it resistant to liquid. In some embodiments, the lid 200 may be made of a solid material (instead of a corrugated material). In some embodiments, the lid 200 may be made of or may include a foam board material or foamcore material. The foam board or foamcore material may provide a rigid surface for the lid 200.

As shown in FIG. 2, the lid 200 includes a rectangular base 205. The rectangular base 205 has a side edge 206, a side edge 207 opposing the side edge 206, an end edge 208 (abutting the side edge 206 and 207), and an end edge 209 opposing the end edge 208. The length of the rectangular base 205 is denoted as Rl. The width of the rectangular base 205 is denoted as W. In an example embodiment, the rectangular base 205 is substantially planar and straight. The rectangular base 205 may have a uniform thickness. In an example embodiment, the thickness of the rectangular base 205 is approximately 0.125 inches. In another embodiment, the thickness of the rectangular base 205 is approximately 0.25 inches. In other embodiments, the thickness of the rectangular base 205 is between approximately 0.125 inches and approximately 0.25 inches. In other embodiments, the thickness of the rectangular base 205 may be more than 0.25 inches. In an example embodiment, Rl is approximately 22.5 inches and W is approximately 15.5 inches. The length of the entire lid 200 is denoted as L. In an example embodiment, L is approximately 26.5 inches. It should be understood that Rl W and L may be another value in other embodiments.

As shown in FIG. 2, the side edge 206 has a notch 210 and a notch 211. Similarly, the side edge 207 also has two notches as illustrated in FIG. 2. The length of the notch is denoted as nl. The distance between the two notches is denoted as $pl_m$. The distance of the notch from the end edge of the rectangular base is denoted as $pl_s$. FIG. 2 also illustrates a portion 220 of the side edge 206 of the base 205 that engages with or rests upon an upper surface of the RPC 100. This feature is further described and illustrated below. Although not illustrated, one can easily understand that the side edge 207 also has a similar portion that engages with or rests upon an upper surface of the RPC 100. In an example embodiment, nl is approximately 3.0 inches, $pl_m$ is approximately 9.0 inches, and $pl_s$ is approximately 3.75 inches. It should be understood that nl, $pl_m$ and $pl_s$ may be another value in other embodiments.

The lid 200 further includes a foldable flap 215 extending outwardly from the end edge 208 of the rectangular base 205, and a foldable flap 216 extending outwardly from the end edge 209 of the rectangular base 205. The length of the flap 215 and 216 is denoted as fl. In an example embodiment, fl is approximately 2.0 inches. It should be understood that fl may be another value in other embodiments. In some embodiments, the RPC includes apertures in the end walls of the RPC that serve as handles for lifting the RPC. In this embodiment, the length of the flaps 215 and 216 may be based on the positon of the apertures, so that when the flaps are folded into the RPC the apertures are not blocked. The flaps 215 and 216 can be folded downwardly inside the RPC 100, and may closely fit against the end walls of the RPC 100. That is, the end edges 208 and 209 of the rectangular base 205 closely abut the end walls of the RPC 100.

The flaps 215 and 216 has the same thickness as the rectangular base 205. In other embodiments, the thickness of the flaps 215 and 216 may be different than that of the rectangular base 205.

As shown in FIG. 2, the lid 200 also includes a fold line or perforations where the foldable flaps 215 and 216 meet the respective end edges 208 and 209. The fold line may indicate to a user where to fold the flaps 215 and 216. The fold line may also make it easy to fold the flaps 215 and 216.

Further, as shown in FIG. 2, the lid 200 includes a cutout 225 on each side of the foldable flaps 215 and 216 where the foldable flaps 215 and 216 meet the respective end edge 208 and 209 of the base 205. The size of the cutout 225 is denoted as c where the cutout is a square (same length and width). In an example embodiment, c is approximately 0.5 inches. It should be understood that c may be another value in other embodiments. In other embodiments, the cutout 225 may be a rectangle, where the length and width of the cutout are not equal.

In some embodiments, the lid 200 is made from a singular sheet of material (for example, corrugated cardboard or corrugated plastic). In this case, fold lines are introduced to the sheet to form flaps 215 and 216, and a portion is removed from the sheet to form notches 210, 211 and cutout 225.

As illustrated in detail below, the short end of the lid 200 folds and slides into the RPC 100, and the long end of lid 200 rests upon the RPC.

Figure 3A:
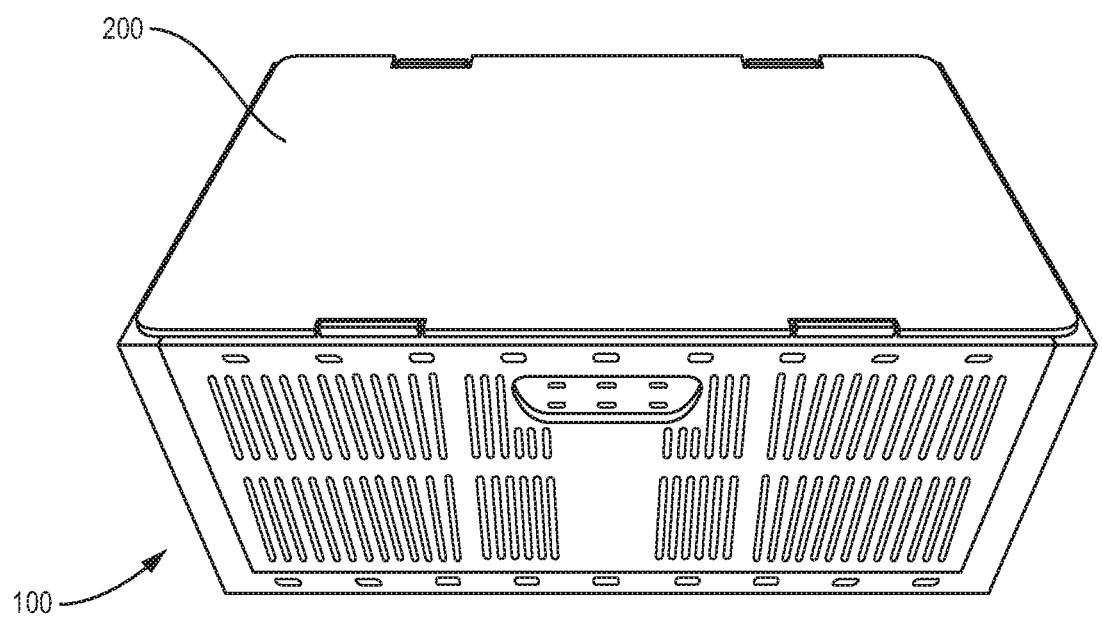
FIGS. 3A and 3B are plan and side views of the lid on the RPC, according to an example embodiment.
Figure 3B:
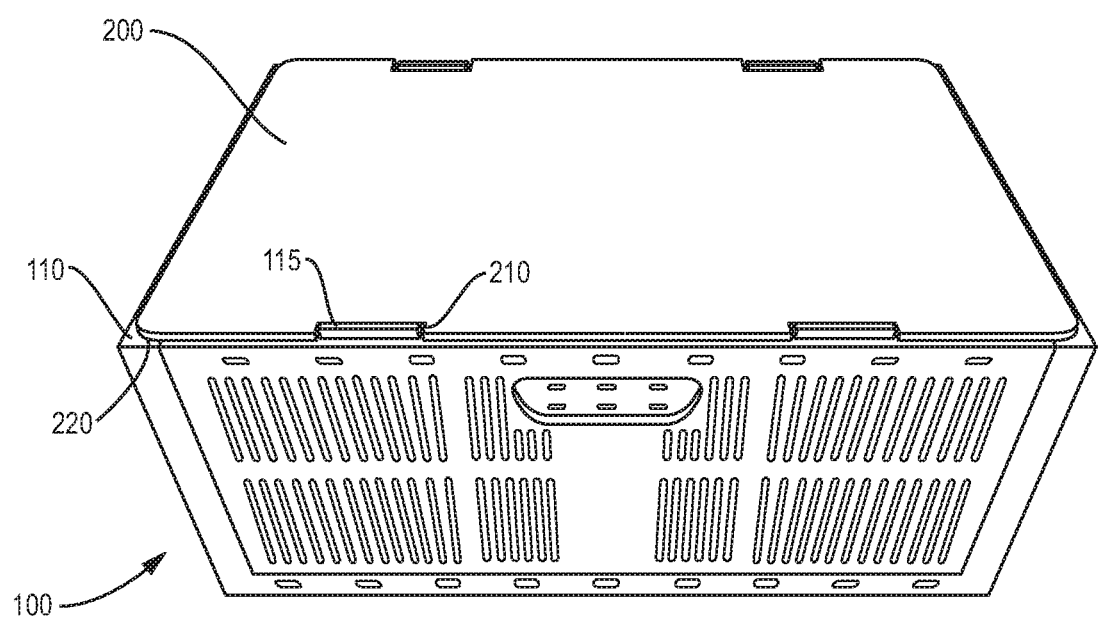

FIG. 3A is a plan view of an exemplary lid 200 on an exemplary RPC 100. FIG. 3B is a side views of the exemplary lid 200 on the exemplary RPC 100, according to an example embodiment. As shown in FIG. 3B, the notch 210 of the lid 200 corresponds to the protrusion 115 of the RPC 100. The notch 210 has a length and width such that it can engage with the protrusion 115. As shown in FIG. 3B, the portion 220 of the side edge of the lid 200 rests on the upper surface 110 of the side wall of the RPC 100 to provide stability and support.

Figure 4A:
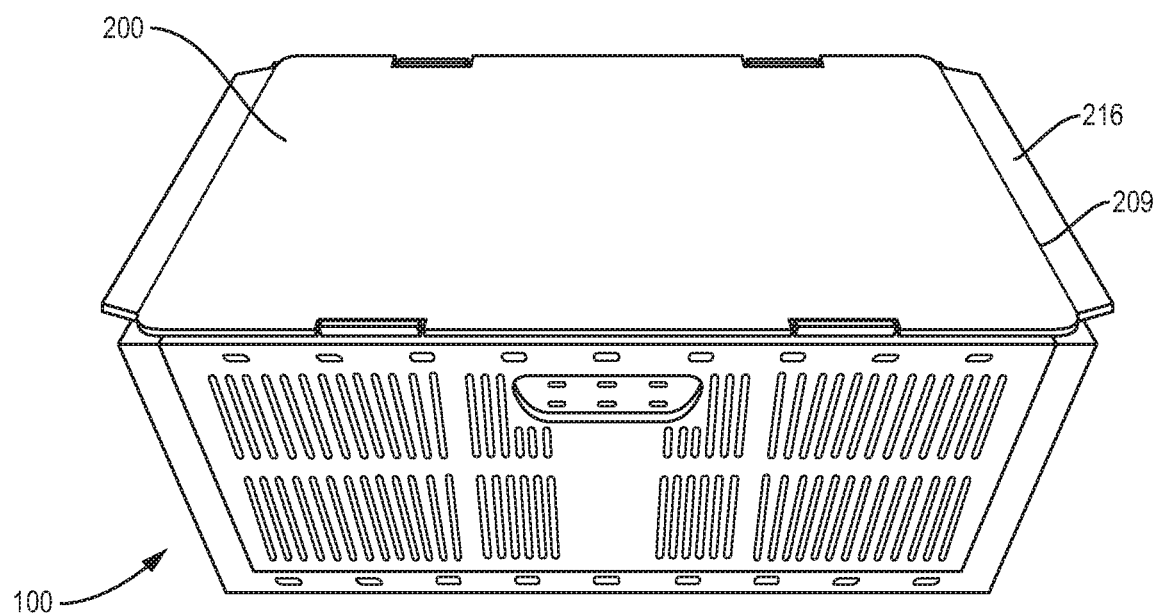
FIGS. 4A and 4B are perspective views of the lid and the RPC, according to an example embodiment.
Figure 4B:
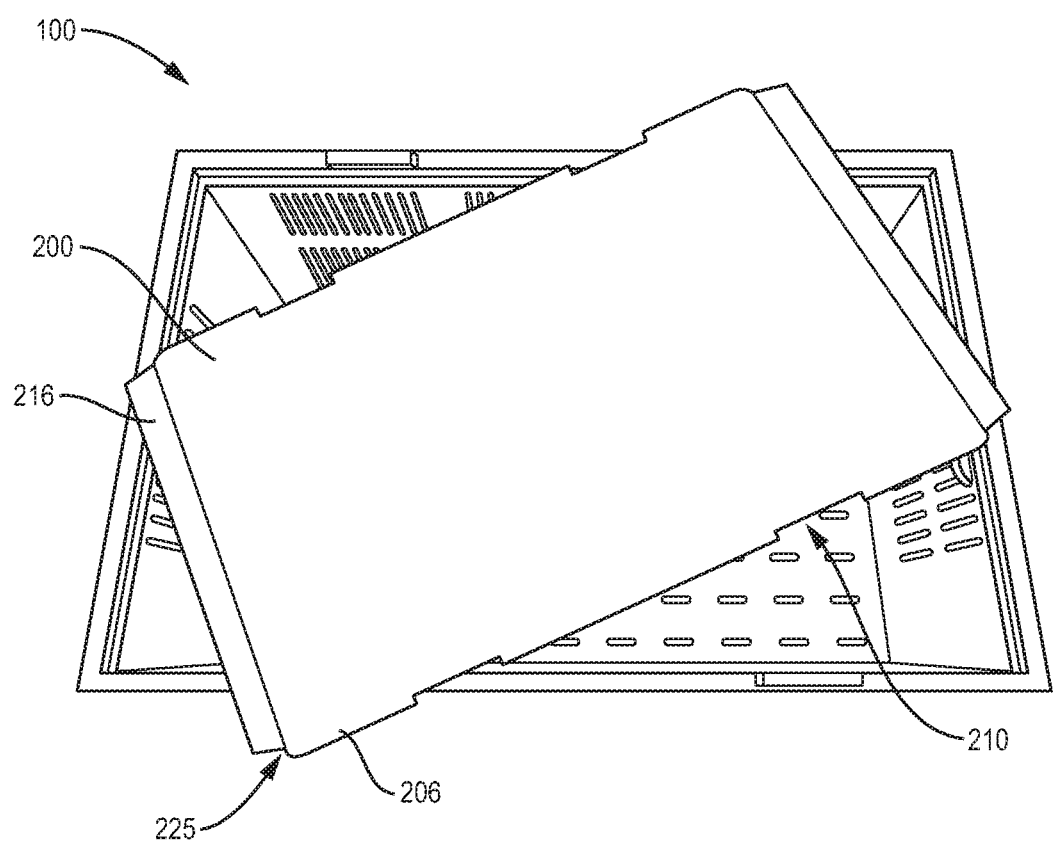

FIGS. 4A and 4B are perspective view of the exemplary lid 200 and the exemplary RPC 100, according to an example embodiment. As shown in FIG. 4A, the lid 200 has the flap 216 extending outwardly from the end edge 209. As shown in FIG. 4B, the lid 200 has the notch 210. FIG. 4B also illustrates the cutout portion 225 on the lid 200 located between the side edge 206 and the flap 216.

Figure 5A:
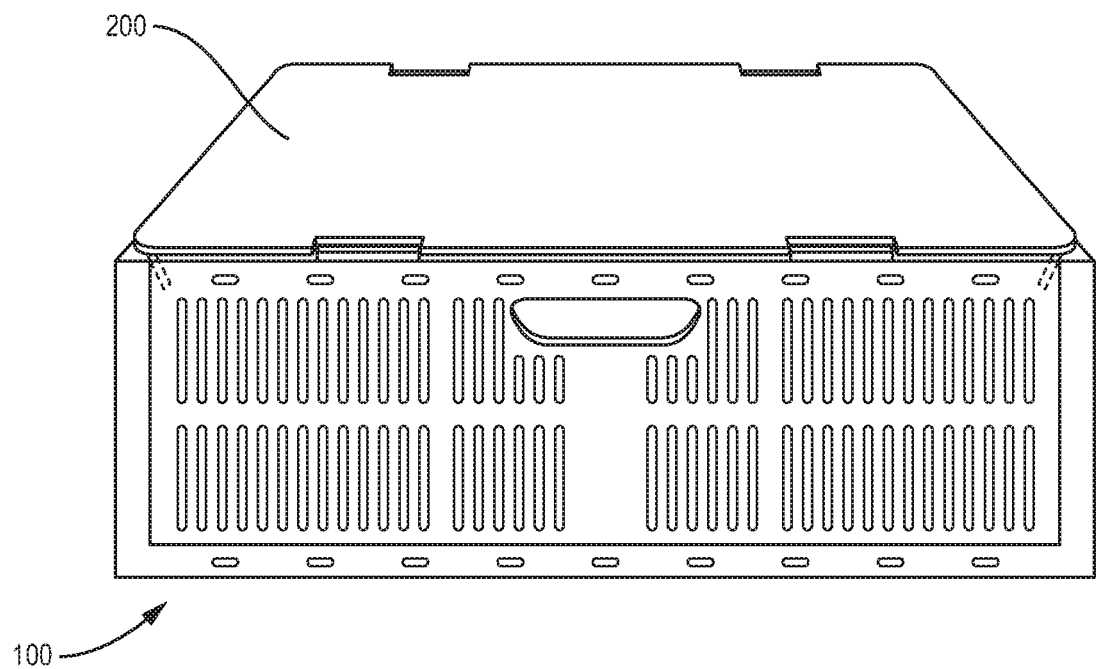
FIGS. 5A and 5B are perspective views of the lid disposed on the RPC, according to an example embodiment.
Figure 5B:
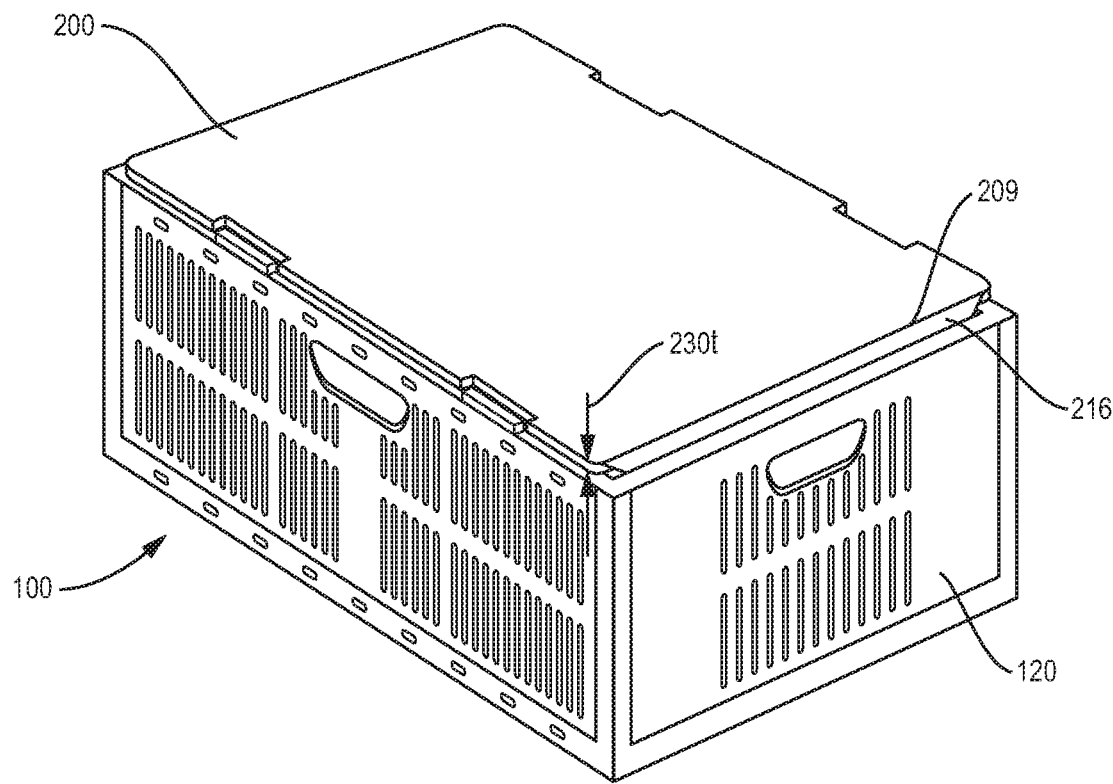

FIGS. 5A and 5B are perspective views of the lid 200 disposed on the RPC 100, according to an example embodiment. As shown in FIG. 5B, the lid 200 has the flap 216 extending outwardly from the side edge 209 of the lid 200. The flap 216 is folded downwardly at an oblique angle into the RPC 100, and engages with the end wall 120 of the RPC 100 to provide stability and support. In some embodiments, the flap 216 may be folded downwardly into the RPC 100 at a right angle. The lid 200 has a thickness t. The depth edge of the lid 200 is denoted by reference numeral 230. In some embodiments, the base 205 of the lid 200 has a uniform thickness t across the base 205. In some embodiments, the flaps 215 and 216 also have the same thickness t as the base 205. In other embodiments, the thickness of the flaps 215 and 216 may be different than thickness t of the base 205. In an example embodiment, the thickness t is 0.125 inches. In another embodiment, the thickness t is 0.25 inches. In yet another embodiment, the thickness t is more than 0.25 inches. In some embodiments, the thickness t of lid 200 may be between approximately 0.125 inches to approximately 0.25 inches.

Figure 6A:
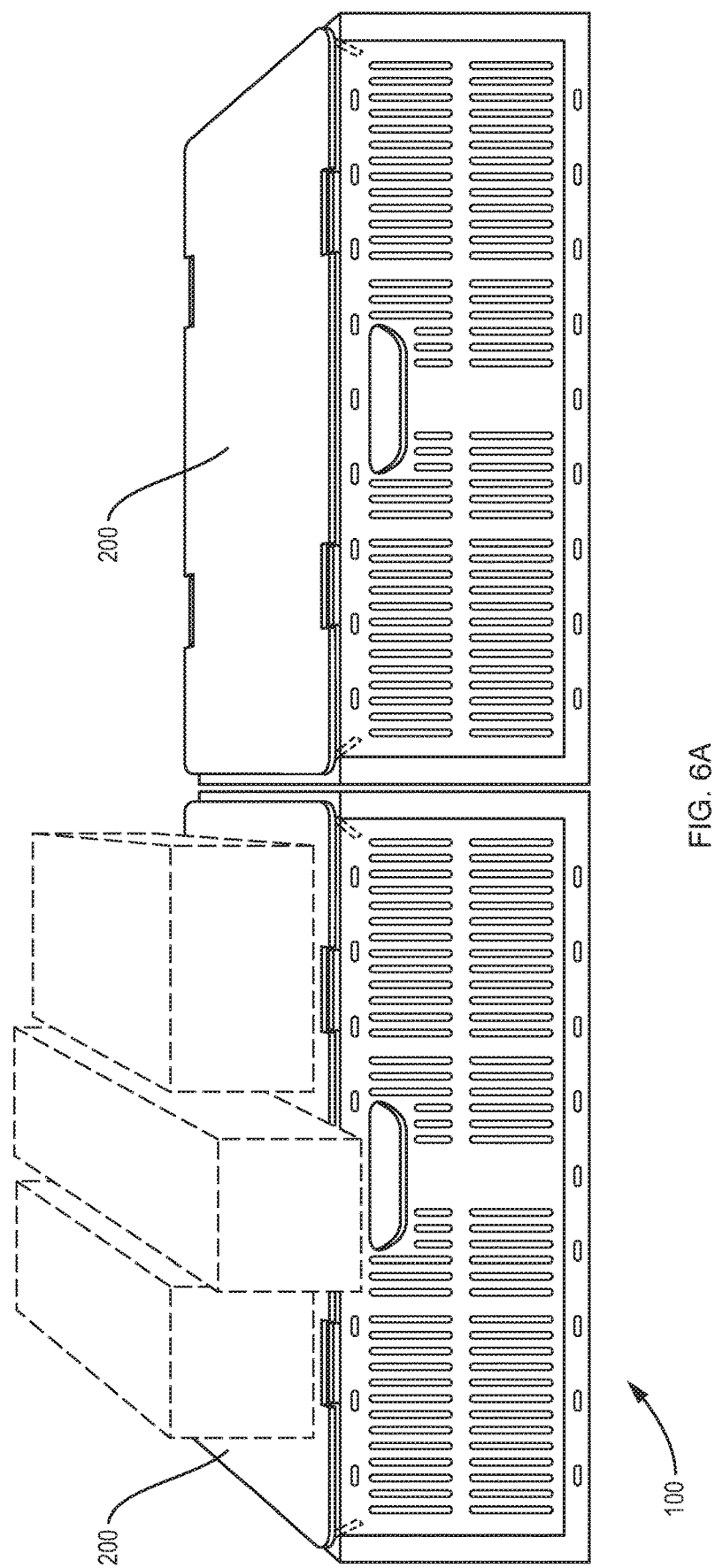
FIGS. 6A and 6B illustrate the lid on the RPC with items placed on the lid.
Figure 6B:
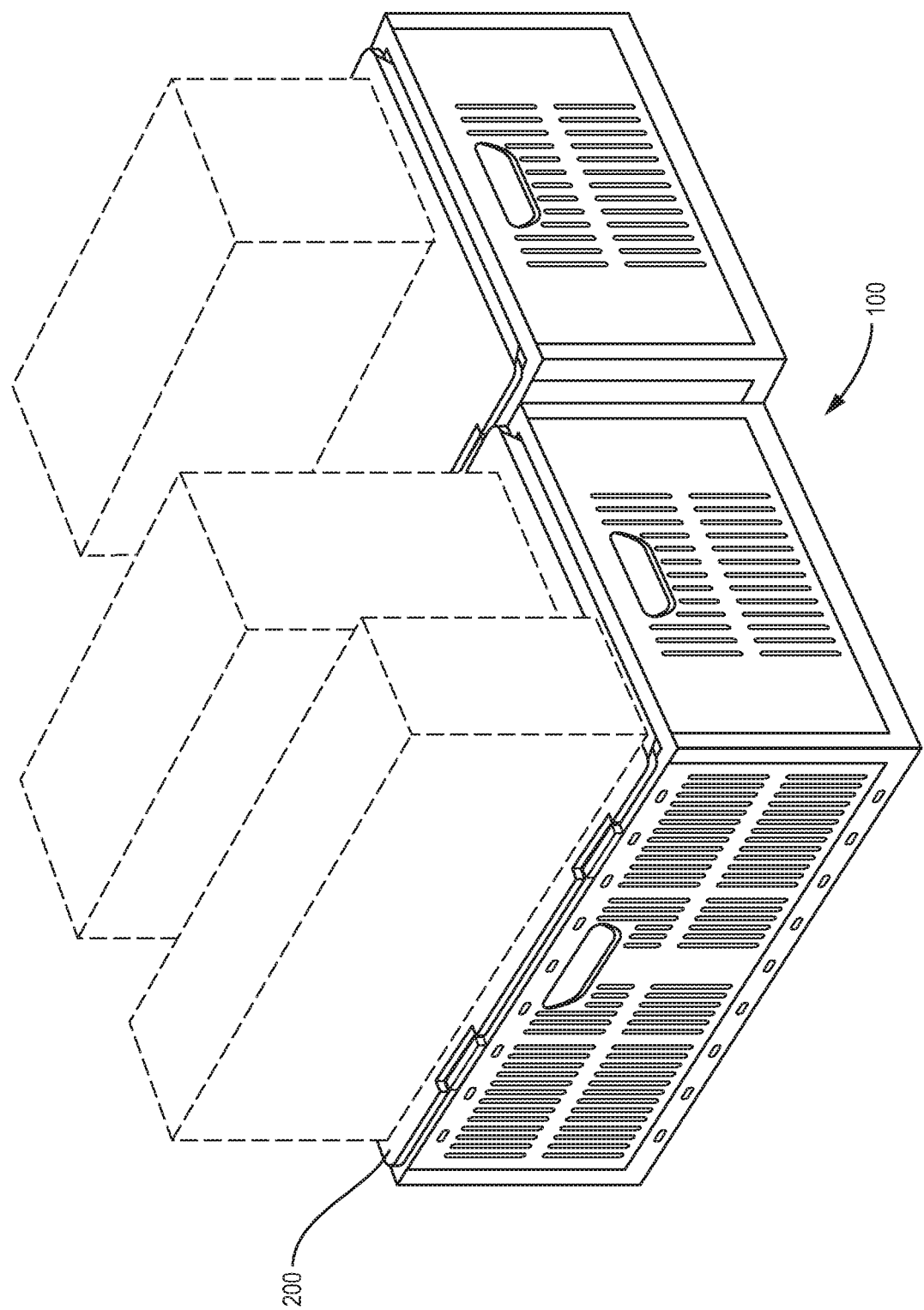

FIGS. 6A and 6B illustrate the exemplary lid 200 on the exemplary RPC 100 with items placed on the lid. In this manner, the lid 200 allows for placement of additional items on the RPC 100 without damaging the items in the RPC 100. The lid 200 is sturdy enough that the lid 200 does not collapse under the weight of the additional items.

Figure 7A:
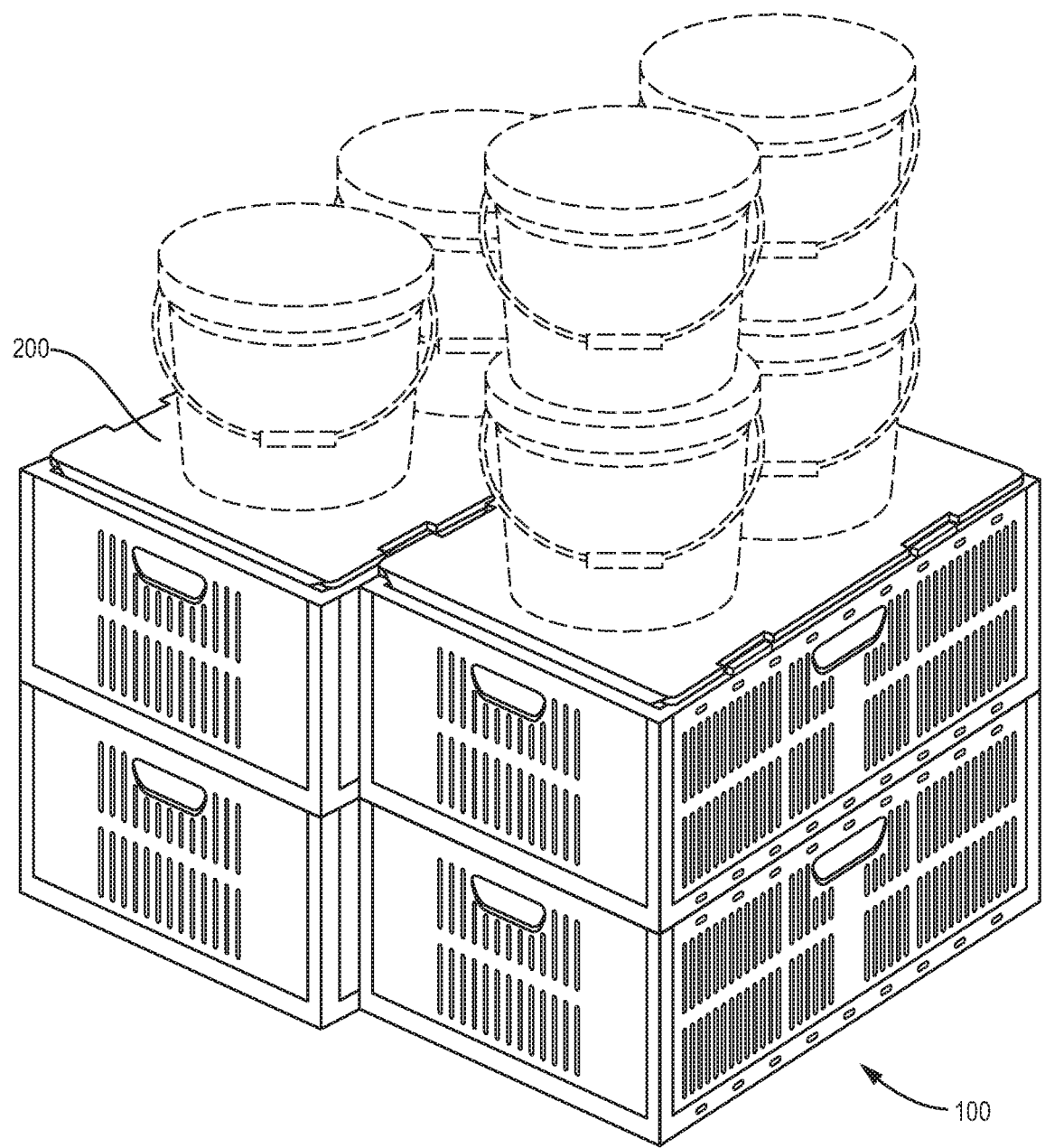
FIGS. 7A and 7B illustrate strength of the lid on the RPC, according to an example embodiment.
Figure 7B:
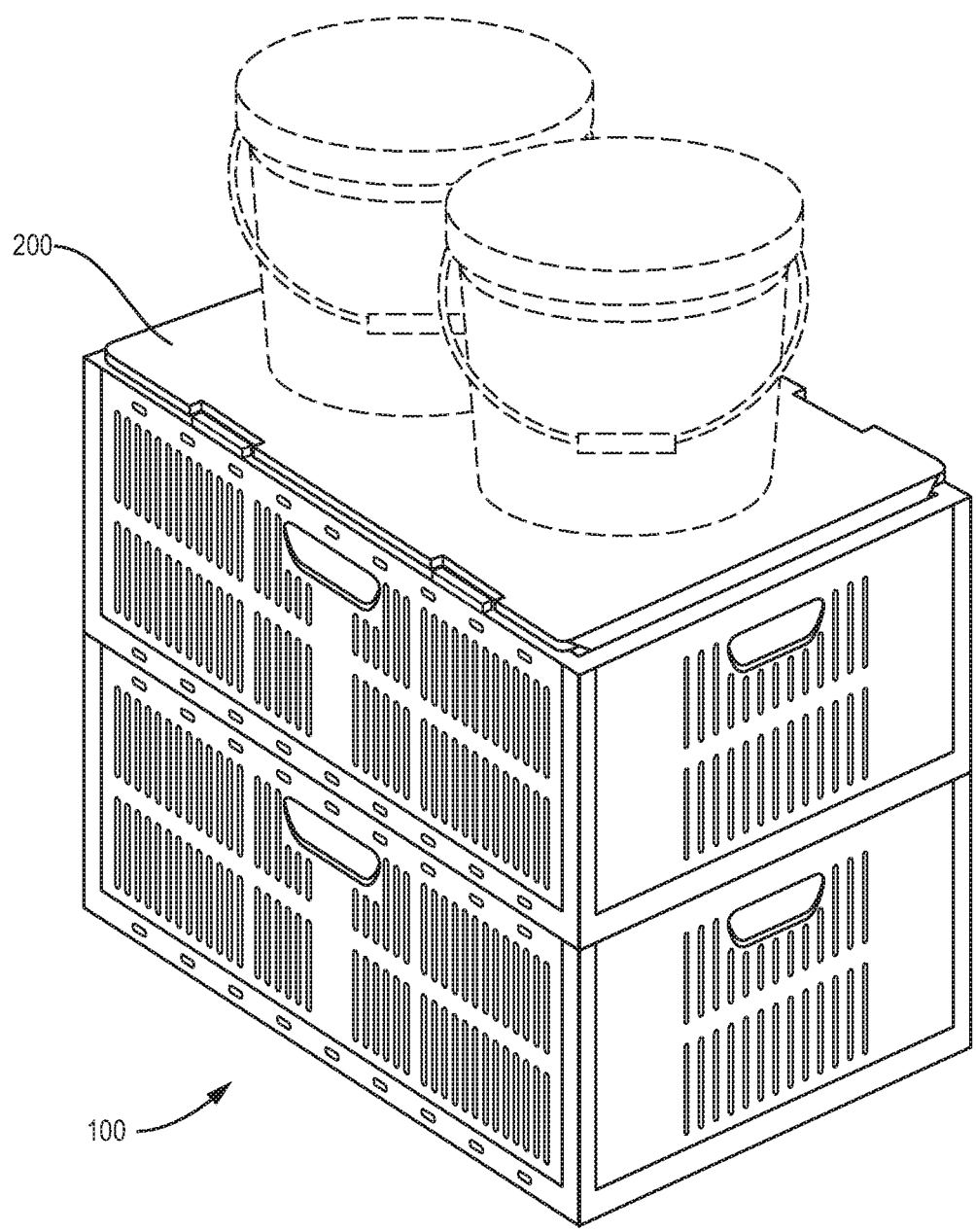

FIGS. 7A and 7B illustrate the strength of the exemplary lid 200 on the exemplary RPC 100, according to an example embodiment. As shown in FIGS. 7A and 7B, the lid 200 can withstand the weight of one or more tubs of icing. Each tub of icing weighs approximately 12 lbs. As illustrated in FIG. 7A, the lid 200 is capable of holding two or four tubs of icing centered on the lid. In some embodiments, the lid 200 may be capable of withstanding approximately 24 lbs. on its top surface without collapsing. In other embodiments, the lid 200 may be capable of withstanding more than 48 lbs. The lid 200 is capable of withstanding approximately 1 lb. to 48 lbs. of weight on its top surface without collapsing.

In some embodiments, objects stacked on the lid 200 are other containers or boxes. As shown in FIGS. 6A and 6B, the weight of the other containers or boxes is distributed along the edge of the lid 200 and the RPC 100 (unlike the icing tubs placed in the center of the lid), which reduces direct pressure on the center of the lid 200. This may allow the lid to withstand more than approximately 48 lbs. The maximum weight the lid 200 is capable of withstanding may depend on the thickness of the lid 200 and the material of the lid 200. For example, a lid 200 made from corrugate cardboard having a thickness of approximately 0.125 inches is capable of withstanding 48 lbs.

Figure 8:
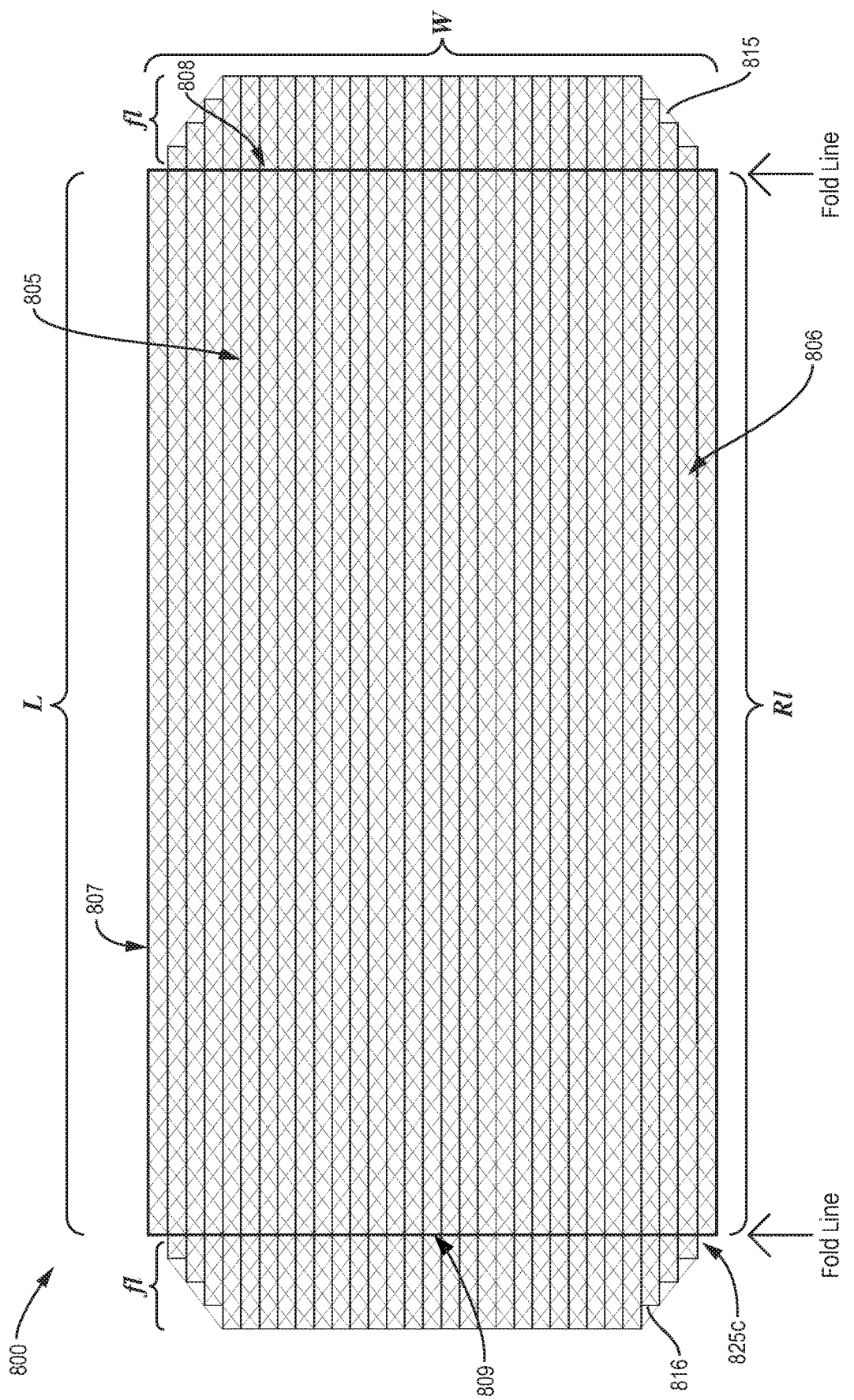
FIG. 8 is a schematic of another exemplary lid, according to an example embodiment.

FIG. 8 is a schematic of another exemplary lid 800, according to an example embodiment. Similar to lid 200, the lid 800 may be made of a corrugated material, such as corrugated cardboard, corrugated paperboard, corrugated plastic, or another suitable corrugated material. In an example embodiment, the corrugated materials is a C flute size. In other embodiments, the corrugated material may have a flute size of A flute, B flute, E flute, F flute, or another flute size suitable for the lid described herein. In an example embodiment, where the lid 800 is made of corrugated cardboard, the lid 800 may be waxed to make it resistant to liquid. In some embodiments, the lid 800 may be made of a solid material (instead of a corrugated material).

As shown in FIG. 8, the lid 800 includes a rectangular base 805. The rectangular base 805 has a side edge 806, a side edge 807 opposing the side edge 806, an end edge 808 (abutting the side edge 806 and 807), and an end edge 809 opposing the end edge 808. The length of the rectangular base 805 is denoted as Rl. The width of the rectangular base 805 is denoted as W. In an example embodiment, the rectangular base 805 is substantially planar and straight. The rectangular base 805 may have a uniform thickness. In an example embodiment, the thickness of the rectangular base 805 is approximately 0.125 inches. In another embodiment, the thickness of the rectangular base 805 is approximately 0.25 inches. In other embodiments, the thickness of the rectangular base 805 is between approximately 0.125 inches and approximately 0.25 inches. In other embodiments, the thickness of the rectangular base 805 may be more than 0.25 inches. The length of the entire lid 200 is denoted as L. In an example embodiment, Rl is approximately 23.0 inches, W is approximately 13.0 inches, and L is approximately 27.0 inches. In another example embodiment, Rl is approximately 23.5 inches, W is approximately 19.5 inches, and L is approximately 27.5 inches. It should be understood that Rl, W and L may be another value in other embodiments.

The lid 800 further includes a foldable flap 815 extending outwardly from the end edge 808 of the rectangular base 805, and a foldable flap 816 extending outwardly from the end edge 809 of the rectangular base 805. The length of the flap 815 and 816 is denoted as fl. In an example embodiment, fl is approximately 2.0 inches. It should be understood that fl may be another value in other embodiments. In some embodiments, the RPC includes apertures in the end walls of the RPC that serve as handles for lifting the RPC. In this embodiment, the length of the flaps 815 and 816 may be based on the positon of the apertures, so that when the flaps are folded into the RPC the apertures are not blocked. The flaps 815 and 816 can be folded downwardly inside the RPC, and may closely fit against the end walls of the RPC. That is, the end edges 808 and 809 of the rectangular base 805 closely abut the end walls of the RPC.

The flaps 815 and 816 has the same thickness as the rectangular base 805. In other embodiments, the thickness of the flaps 815 and 816 may be different than that of the rectangular base 805.

As shown in FIG. 8, the lid 800 also includes a fold line or perforation where the foldable flaps 815 and 816 meet the respective end edges 808 and 809. The fold line may indicate to a user where to fold the flaps 815 and 816. The fold line may also make it easy to fold the flaps 815 and 816.

Further, as shown in FIG. 8, the lid 800 includes a cutout 825 on each side of the foldable flaps 815 and 816 where the foldable flaps 815 and 816 meet the respective end edge 808 and 809 of the base 805. The size of the cutout 825 is denoted as c where the cutout is a square (same length and width). In an example embodiment, c is approximately 0.5 inches. It should be understood that c may be another value in other embodiments. In other embodiments, the cutout 825 may be a rectangle, where the length and width of the cutout are not equal.

In some embodiments, the lid 800 is made from a singular sheet of material (for example, corrugated cardboard or corrugated plastic). In this case, fold lines are introduced to the sheet to form flaps 215 and 216, and a portion is removed from the sheet to form the cutout 825.

Figure 9A:
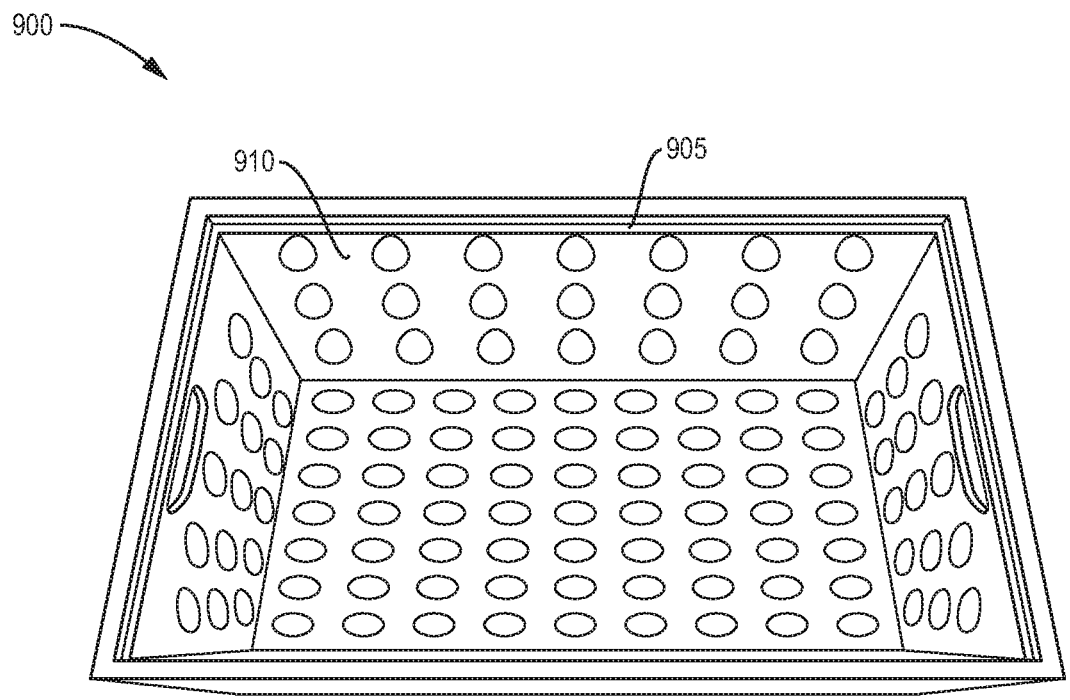
FIGS. 9A and 9B are top and side views of another exemplary RPC.
Figure 9B:
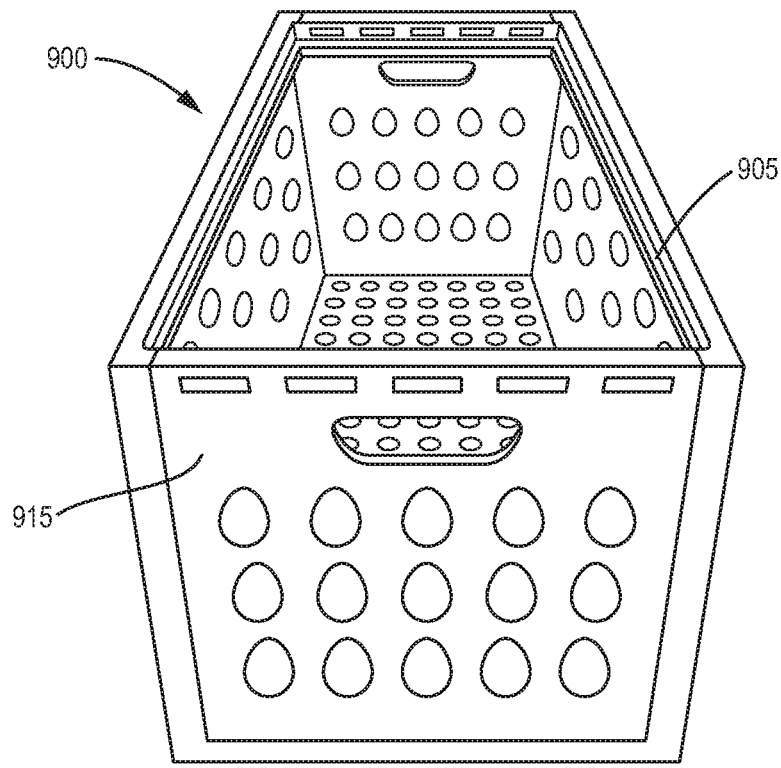

FIGS. 9A and 9B are images of another exemplary RPC 900. FIG. 9A is a top view of the RPC 900. FIG. 9B is a side view of the RPC 900. The RPC 900 may be used for packing and transporting eggs or egg cartons. The RPC 900 includes a shelf 905 protruding from an inner surface of a side wall 910 of the RPC 900. The exemplary lid 800 of FIG. 8 can be used to cover the open end of the RPC 900. The lid 800 is configured such that it slides into the open end of the RPC 900. The side edges 206 and 207 rest upon the shelf 905 to prevent the lid 900 from sliding further into the RPC 900. The flaps 815 and 816 fold downwardly into the RPC 900 and engage with the inner surface of the end walls 915 of the RPC 900.

Figure 10A:
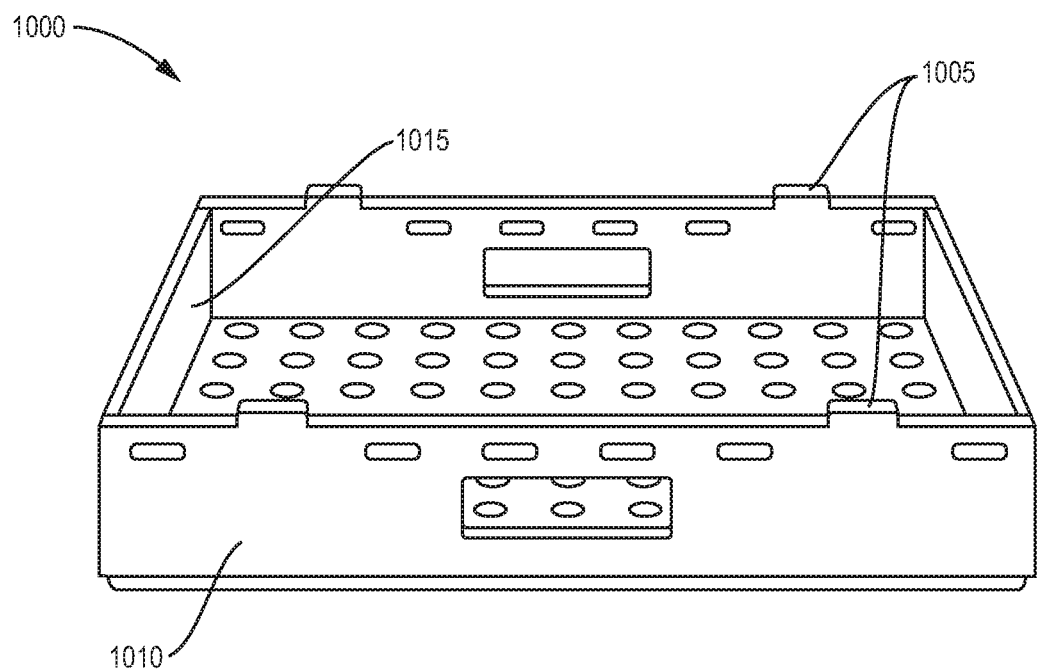
FIGS. 10A and 10B are top and side views of another exemplary RPC.
Figure 10B:
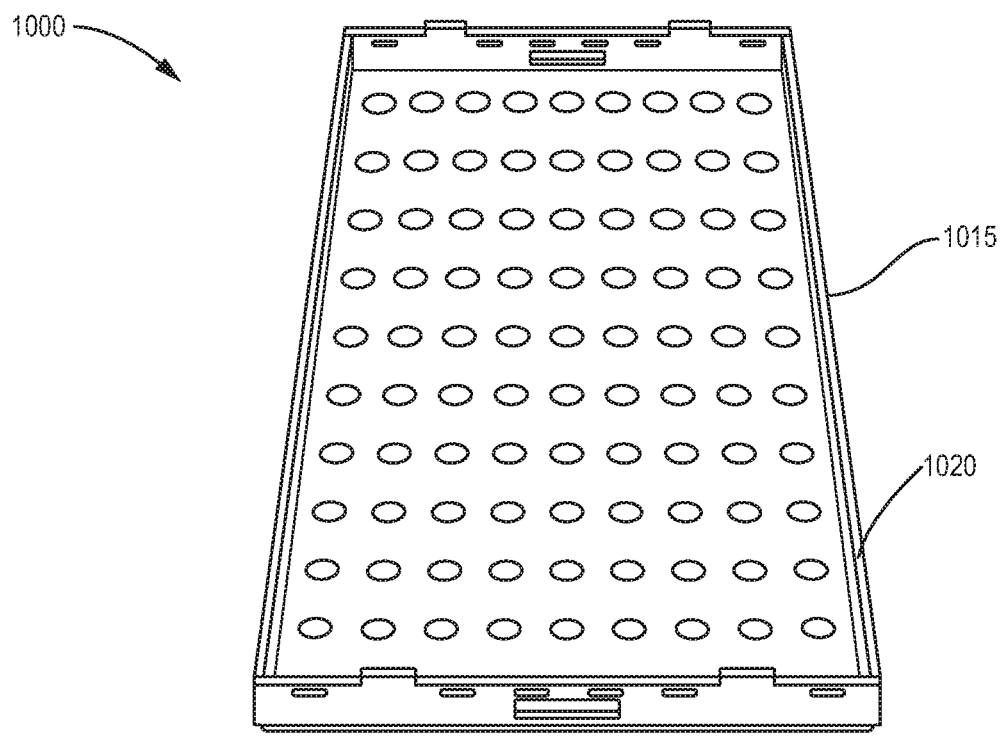

FIGS. 10A and 10B are images of another exemplary RPC 1000. FIG. 10A is a side view of the RPC 1000. FIG. 10B is a top view of the RPC 1000. The RPC 1000 may be used for packing and transporting meat or packages of meat. The RPC 1000 includes a protrusion 1005 on the end walls 1010 of the RPC 1000. The flaps 815 and 816 of the lid 800 fold downwardly into the RPC 1000 and engages with the inner surface of the end walls 1010. Thus, the protrusions 1005 of the RPC 1000 do not prevent the lid 800 from covering the open end of the RPC 1000. The RPC 1000 also includes side walls 1015, and each of the side walls 1015 has an upper surface 1020. The side edges 806 and 807 of the lid 800 rest upon the upper surface 1020 of the side walls 1015 to provide support and stability.

Figure 11:
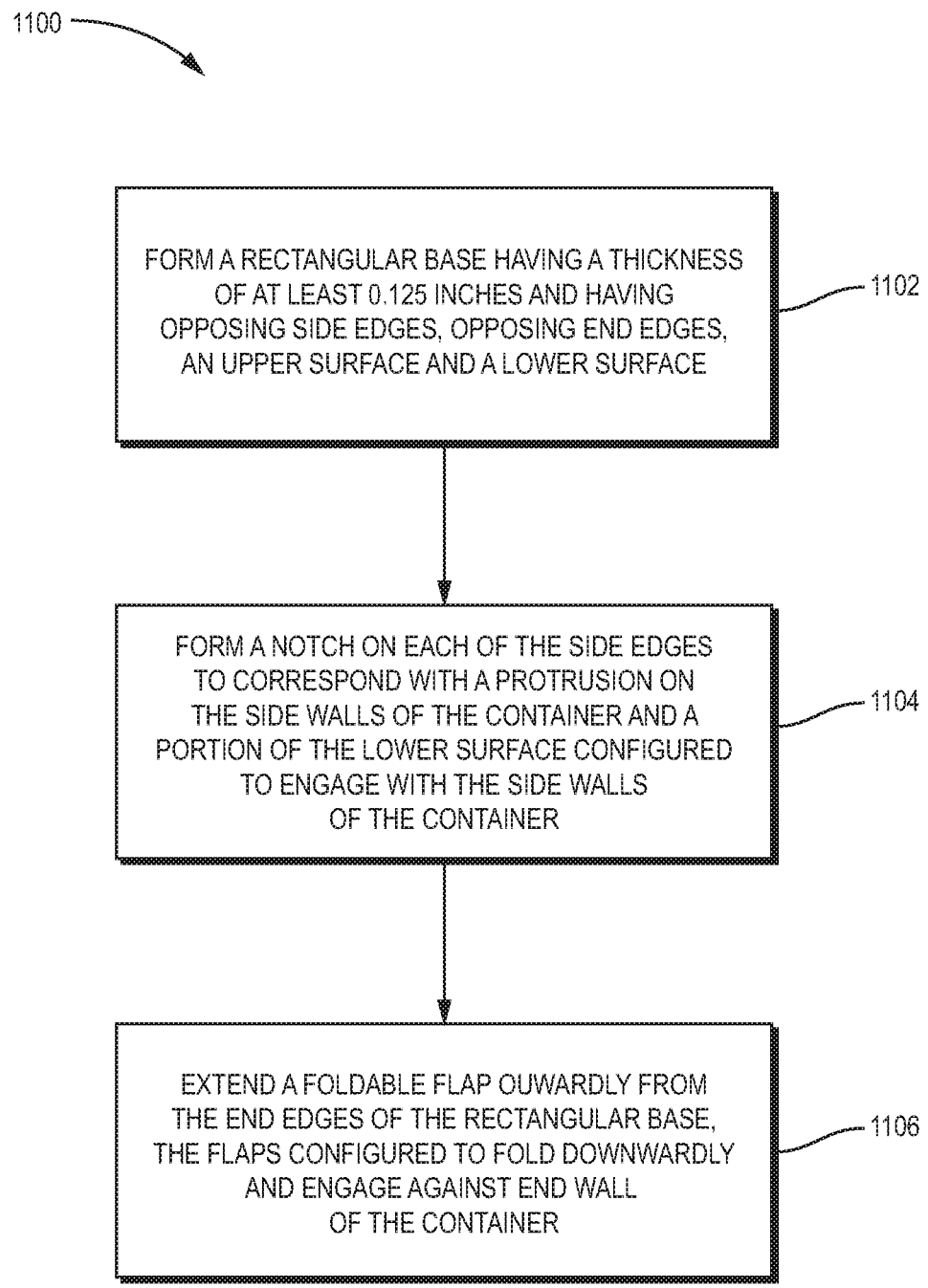
FIG. 11 is a flowchart illustrating an exemplary method for forming a lid for an RPC, according to an example embodiment.

FIG. 11 is a flowchart illustrating an exemplary method 1100 for forming a lid for an RPC, according to an example embodiment. The method includes, at step 1102, forming a rectangular base having a thickness of at least 0.125 inches. As described above, the thickness of at least approximately 0.125 inches allows the lid to hold items of a certain weight without collapsing. The rectangular base is formed to also include two opposing side edges, two opposing end edges, an upper surface and a lower surface. The rectangular base may be a sheet, and may be formed using a corrugated material. In some embodiments, the corrugated material is corrugated cardboard or corrugated plastic.

In other embodiments, the lid may be made of a material other than corrugated material. For example, the lid may be made from sheets of cardboard, paperboard, or plastic. In alternative embodiments, the lid may be made from a suitable material that allows the lid to have foldable edges and hold a certain amount of weight without collapsing.

In other embodiments, the rectangular base may have a thickness of approximately 0.25 inches. In some embodiments, the rectangular base may be of uniform thickness. In other embodiments, the rectangular base may have varying thickness across the length of the base. In some embodiments, the base may be a square such that the width and the length of the base is the same.

The method further includes, at step 1104, forming at least one notch on each of the side edges of the rectangular base. The notch is formed such that it corresponds to a protrusion on the upper surface of the side walls of the RPC. A portion of the lower surface at the side edge of the rectangular base is configured to engage with a portion of the upper surface of the side walls of the RPC. This portion of the upper surface of the side walls is the non-protrusion portion of the upper surface of the side walls of the RPC. Engaging a portion of the lower surface of the lid with a portion of the upper surface of the RPC provides stability and support.

In an example embodiment, two notches are formed on each of the two side edges of the rectangular base. In other embodiments, more than two notches may be formed on each of the two side edges based on the protrusions on the side wall of the RPC. In some embodiments, one or more notches may be formed on one or more of the end edges of the rectangular base based on protrusions being available on one or more of the end walls of the RPC. In some embodiments, the length and width of the notch is determined based on the length and width of the protrusion on the wall of the RPC. In some embodiments, where more than one notch is formed on the edge of the rectangular base, the distance between the notches is determined based on the distance between the more than one protrusions on the wall of the RPC.

The method also includes, at step 1106, extending a foldable flap outwardly from each of the two end edges of the rectangular base. The foldable flaps are configured to fold downwardly and engage with the end walls of the RPC. The lid may include fold lines or perforation where the flaps extend from the end edges of the rectangular base to indicate to the user where the flaps fold. The fold lines or perforation may also be provided for ease of downwardly folding the flaps. The flaps may be made of the same material as the rectangular base, and may have the same thickness as the rectangular base.

In other embodiments, the flaps may be made of a material different than the material of the rectangular base. The flaps may also have a thickness different than that of the rectangular base.

In an example embodiment, the method also includes forming or providing a cutout in the foldable flaps where the flaps extend from the end edge of the rectangular base. The cutout may be approximately 0.5 inches in length and approximately 0.5 inches in width. The cutout may be located at an end portion of the flap as shown in at least FIGS. 2 and 8 by cutout 225 and 825. The cutouts 225 and 825 allow the flaps of the lid to fold into the RPC, while allowing the side edges of the lid to be supported by the side walls of the RPC.

The embodiments described and illustrated above include flaps that fold downwardly into the RPC and engage with the interior of the end walls of the RPC. In alternative embodiments, the flaps of the lid may fold downwardly on outside of the RPC and over the end walls of the RPC. In this embodiment, the flaps may also include a tongue, tab or an additional flap extending from the distal portion of the flap that are configured to engage with a handle of the RPC. The tongue or tab may be tucked into the handle of the RPC. This allows access to the handles of the RPC.

In some embodiments, the lid may be made of cardboard and may be a single-use lid. In other embodiments, the lid may be made of plastic and may be a re-usable lid after the plastic lid has been sanitized and prepared for the next use.

In addition to enabling placement of smaller containers and items on top of the RPC, the lid described herein may also prevent dust and debris from falling into the RPC. In some cases, the lid described herein may also prevent light from entering the RPC which enables storage and transport of items that are sensitive to light.

In an example embodiment, the lid may include a strip of metal coupled to the lower surface of the rectangular base to provide additional support for withstanding the weight of items placed on the lid. The metal strip may be coupled to the lower surface along the length of the lid at a central axis of the lid.

The lid described herein is also easy for user to install or use as a cover for an RPC. The fold lines make it easy for a user to fold the flaps into the RPC. Then the lid falls into place and rests upon the side walls of the RPC for support. There are no additional elements that require user interaction to prepare the lid for use.

In the manner, the present disclosure describes a lid for substantially covering the open end of a container. The lid includes foldable flaps that fold downwardly into the container and engages with end walls of the container. The lower surface of the lid also rests upon or engages with the upper surface of the side walls of the container to provide support and stability. The lid allows for smaller containers and items to be stacked on the container for easy and efficient transport.

The following description is presented to enable a person skilled in the art to create and use a lid for covering an reusable plastic container. Various modifications to the example embodiments will be readily apparent to those skilled in the art, and the generic principles defined herein may be applied to other embodiments and applications without departing from the spirit and scope of the present disclosure. Moreover, in the following description, numerous details are set forth for the purpose of explanation. However, one of ordinary skill in the art will realize that the embodiments may be practiced without the use of these specific details. In other instances, well-known structures and processes are shown in block diagram form in order not to obscure the description of embodiments with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps can be replaced with a single element, component or step. Likewise, a single element, component or step can be replaced with multiple elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

What is claimed is:

1. A singular sheet configured to form a lid substantially closing a container, the sheet comprising:
    a solid rectangular base having two opposing side edges, two opposing end edges, an upper surface and a lower surface;
    four notches including two notches included and recessed inwardly on a first one of the two side edges and two notches included and recessed inwardly on a second one of the two side edges, the two notches on each of the two sides being separated by a distance that is at least three times a length of each of the two notches, the four notches to correspond with a protrusion on an upper surface of each of two side walls of the container, and a portion of the lower surface of the sheet at the two side edges configured to engage with the upper surface of each of the two side walls of the container, wherein the two notches on the first one of the two side edges are aligned with and opposingly spaced from the two notches on the second one of the two side edges;
    a foldable flap extending outwardly from each of the two end edges, the foldable flaps extending a width of the rectangular base and having angled side edges so that a distal portion of the foldable flap has a width that is less than the width of the rectangular base, the foldable flap configured to fold downwardly, wherein outer surfaces of the foldable flaps are configured to frictionally engage against inner surfaces of each of two end walls of the container; and
    wherein the rectangular base has a length that is approximately forty to approximately fifty percent longer than the width of the rectangular base, and a thickness of at least 0.125 inches to support weight of items placed on the upper surface of the rectangular base without collapsing.

2. The sheet of claim 1, wherein the rectangular base and the foldable flaps are made of corrugated cardboard.

3. The sheet of claim 1, wherein the rectangular base and the foldable flaps are made of corrugated plastic.

4. The sheet of claim 1, further comprising fold lines at each of the foldable flaps.

5. The sheet of claim 1, wherein the rectangular base supports at least approximately 48 pounds.

6. The sheet of claim 1, further comprising a cutout in the foldable flaps where the foldable flaps meet the rectangular base, the cutout having a length of at least 0.5 inches and a width of at least 0.5 inches.

7. The sheet of claim 1, wherein each of the two side edges includes three or more notches.

8. A singular sheet configured to form a lid substantially closing a meat or egg container, the sheet comprising:
    a solid rectangular base having two opposing side edges, two opposing end edges, an upper surface and a lower surface;
    two notches included on each of the two side edges, each notch located opposite an opposing notch, the notches to correspond with a protrusion on an upper surface of each of two side walls of the container, and a portion of the lower surface of the sheet at the two side edges configured to engage with the upper surface of each of the two side walls of the container;

a foldable flap extending outwardly from each of the two end edges, the foldable flaps configured to fold downwardly, wherein outer surfaces of the foldable flaps are configured to frictionally engage against inner surfaces of each of two end walls of the container; and wherein the rectangular base having a thickness of at least 0.125 inches to support weight of items placed on the upper surface of the rectangular base without collapsing.

9. The sheet of claim 8, wherein a portion of each of the two side edges of the rectangular base engages with protrusions on an interior surface of the container.

10. The sheet of claim 8, wherein the rectangular base and the foldable flaps are made of corrugated cardboard.

11. The sheet of claim 8, wherein the rectangular base and the foldable flaps are made of corrugated plastic.

12. The sheet of claim 8, further comprising fold lines at each of the foldable flaps.

13. The sheet of claim 8, wherein the rectangular base supports at least approximately 48 pounds.

14. The sheet of claim 8, further comprising a cutout in the foldable flaps where the foldable flaps meet the rectangular base.

15. A method for forming a singular sheet for substantially closing a produce container, the method comprising:

forming a solid rectangular base having a thickness of at least 0.125 inches to support weight of items placed on the rectangular base, and having two opposing side edges, two opposing end edges, an upper surface and a lower surface;

forming two notches on each of the two side edges, each notch located opposite an opposing notch, the notches to correspond with a protrusion on an upper surface of each of two side walls of the container, and a portion of the lower surface of the sheet at the two side edges configured to engage with the upper surface of each of the two side walls of the container; and extending a foldable flap outwardly from each of the two end edges, the foldable flaps configured to fold downwardly, wherein outer surfaces of the foldable flaps are configured to frictionally engage against inner surfaces of each of two end walls of the container.

16. The method of claim 15, further comprising forming the rectangular base and the foldable flaps using corrugated cardboard.

17. The method of claim 15, further comprising forming the rectangular base and the foldable flaps using corrugated plastic.

18. The method of claim 15, further comprising forming a cutout in the foldable flaps where the foldable flaps meet the rectangular base.

19. The method of claim 15, further comprising forming fold lines at each of the foldable flaps.

20. The method of claim 15, further comprising forming additional notches on each of the two side edges of the rectangular base.

21. A system comprising:

a container having an open end, two opposing side walls, and two opposing end walls, each of the two side walls having a protrusion on an upper surface of the two side walls;

a solid sheet having a rectangular base with two opposing side edges, two opposing end edges, an upper surface and a lower surface;

two notches included on each of the two side edges, each notch located opposite an opposing notch, the notches to correspond with the protrusion on the upper surface of each of the two side walls of the container, a portion of the lower surface of the sheet at the two side edges configured to engage with the upper surface of each of the two side walls of the container;

a foldable flap extending outwardly from each of the two end edges of the sheet, the foldable flaps configured to fold downwardly, wherein outer surfaces of the foldable flaps are configured to frictionally engage against inner surfaces of each of the two end walls of the container; and wherein the sheet has a thickness of at least 0.125 inches to support weight of items placed on the upper surface of the rectangular base without collapsing.

* * * * *